United States Patent [19]

Okada et al.

[11] Patent Number: 4,868,807
[45] Date of Patent: Sep. 19, 1989

[54] WAVELENGTH SELECTIVE OPTICAL DATA STORAGE SYSTEM

[75] Inventors: Kazuo Okada; Michihiro Tadokoro; Hitoshi Imai, all of Amagasaki, Japan

[73] Assignee: Mitsubishi Denki Kabushiki Kaisha, Tokyo, Japan

[21] Appl. No.: 182,118

[22] Filed: Apr. 15, 1988

[30] Foreign Application Priority Data

Apr. 16, 1987 [JP] Japan .................................. 62-93770

[51] Int. Cl.⁴ ........................ G11B 7/00; G11C 13/04
[52] U.S. Cl. .................................... 369/109; 369/102; 369/121; 365/106; 346/76 L; 346/135.1
[58] Field of Search ............... 365/106, 119, 120, 123; 369/100, 102, 109, 121, 112; 346/76 L, 135.1

[56] References Cited

U.S. PATENT DOCUMENTS

| | | | |
|---|---|---|---|
| 4,101,976 | 7/1978 | Castro et al. | 365/119 |
| 4,432,071 | 2/1984 | Szabo | 365/125 X |
| 4,689,781 | 8/1987 | Ando | 369/112 |
| 4,783,776 | 11/1988 | Ishigaki et al. | 369/109 |

FOREIGN PATENT DOCUMENTS 58-51355 11/1983 Japan .

Primary Examiner—Robert L. Richardson
Attorney, Agent, or Firm—Fleit, Jacobson, Cohn, Price, Holman & Stern

[57] ABSTRACT

A recording medium for wavelength selective optical data storage has at least one memory element on which information is recorded by creating recording holes on the absorption spectrum thereof. The spectrum has at least one prerecorded hole for identifying the wavelength positions of the recording holes.

8 Claims, 4 Drawing Sheets

FIG.1
PRIOR ART
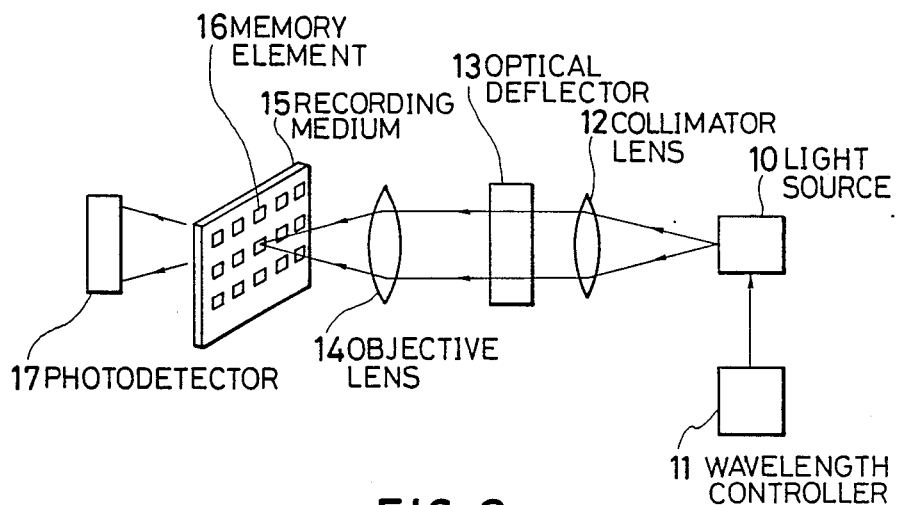
FIG.2
PRIOR ART
FIG.2A
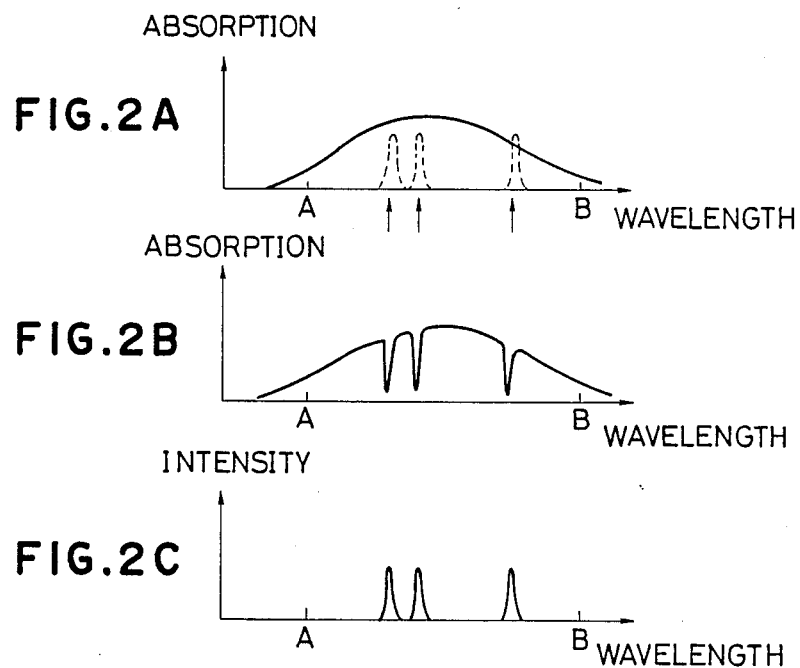
FIG.2B
FIG.2C

WAVELENGTH SELECTIVE OPTICAL DATA STORAGE SYSTEM

BACKGROUND OF THE INVENTION

This invention relates to a wavelength selective optical data storage apparatus.

FIG. 1 shows an wavelength selective optical data storage apparatus and FIGS. 2A, 2B and 2C show the wavelength spectra of the recording medium, which were proposed previously, in the Japanese Patent Publication No. 51355/1983. A diverging beam emitted from light source 10 is collimated by collimator lens 12. The parallel beam from lens 12 passes through optical deflector 13 and is focused by objective lens 14 on memory element 16 of recording medium 15 which has a function of wavelength selective optical data storage. Specifically, the recording medium 15 exhibits inhomogeneous absorption line broadening and undergoes a photo induced reaction upon exposure to light. One of elements 16 is selected by deflecting the beam through deflector 13. The beam transmitted through element 16 is detected by photodetector 17.

The principle of wavelength selective optical data storage is described below with reference to FIGS. 2A, 2B and 2C. FIG. 2A shows an absorption spectrum of recording medium 15 on which no recording is made. It is understood from FIG. 2A that the light beam with broad range of wavelength is absorbed by element 16. When the beam of a wavelength with intensity spectrum as shown by the dotted line in FIG. 2A is incident on element 16, a hole is created or burned at the corresponding wavelength position in the absorption spectrum as shown in FIG. 2B. The hole corresponds to a data bit "1" being recorded on the wavelength. Therefore, a data bit "0" is expressed with the non-hole portion.

Any hole can be created, in other words a data bit "1" can be recorded, by adjusting the wavelength of light source 10 to that of the recording hole and making the light intensity high at the level necessary for recording.

The beam emitted from source 10 is scanned or tuned by wavelength controller 11 in a recording wavelength band having an upper limit A and a lower limit B with a constant low intensity to reproduce the wavelength selective optical storing of data. Since the absorptive power of the element is lowered at the wavelength of the recording hole as shown in FIG. 2B, the output of photodetector 17 has the spectrum as shown in FIG. 2C. Although FIG. 2C shows a wavelength spectrum, photodetector 17 outputs a time series signal corresponding to the spectrum when the wavelength is scanned at a constant rate.

A problem of known wavelength selective optical data storage devices is identification of the positions of recording holes on the spectrum at the time of recording and reproducing. Thousands of recording holes can be created within the broad band spectrum of FIG. 2A. This means that information of thousands of bits can be recorded. It is necessary, however, to control precisely the absolute wavelength of source 10. The wavelength width of a hole is typically in a range of tens to hundreds of MHz in frequency and it is very difficult to adjust the wavelength of the optical beam to the extent of the above-mentioned value. Even though a wavelength can be abjusted in a predetermined value, the hole position will shift on the spectrum of recording medium 15 when the spectrum characteristic has slightly changed because of temperature variations or aging changes. In this case, rewriting over a hole position may occur unintentionally.

Also this is a problem at the time of reproducing. Namely, although a signal as shown in FIG. 2C is reproduced by scanning the wavelength of light source 10, it is difficult to identify the positions of recording holes on the spectrum.

SUMMARY OF THE INVENTION

An object of the invention is to solve the problems stated above.

Another object of the invention is to provide an apparatus which is able to identify the wavelength positions of holes to be recorded without measuring the absolute wavelength, and the orders of reproduced holes in spite of temperature variations or aging changes.

According to the invention, there is provided a wavelength selective optical data storage apparatus comprising a light source emitting a light beam with a variable wavelength, a recording medium having at least one memory element with a characteristic of wavelength selective optical data storage, on which information is recorded by creating recording holes at the selected wavelength positions on the spectrum thereof, an optical means guiding and focusing the beam emitted from the source onto the recording medium, a photodetector detecting the beam trasmitted through or reflected by the recording medium, wherein the spectrum of every memory element has at least one prerecorded hole at a predetermined wavelength position for indentifying wavelength positions of the recording holes to be recorded or reproduced.

Since the wavelength position is identified by referring to the prerecorded hole, the requirement for precise adjustment of absolute wavelength can be relaxed at the time of recording and reproducing.

BRIEF DESCRIPTION OF THE DRAWINGS

FIG. 1 is a structural diagram showing known optical wavelength division multiplex recording and reproducing apparatus.

FIGS. 2A, 2B and 2C are explanatory diagrams explaining the principle of the apparatus shown in FIG. 1.

DETAILED DESCRIPTION OF THE PREFERRED EMBODIMENTS

Figure 3:
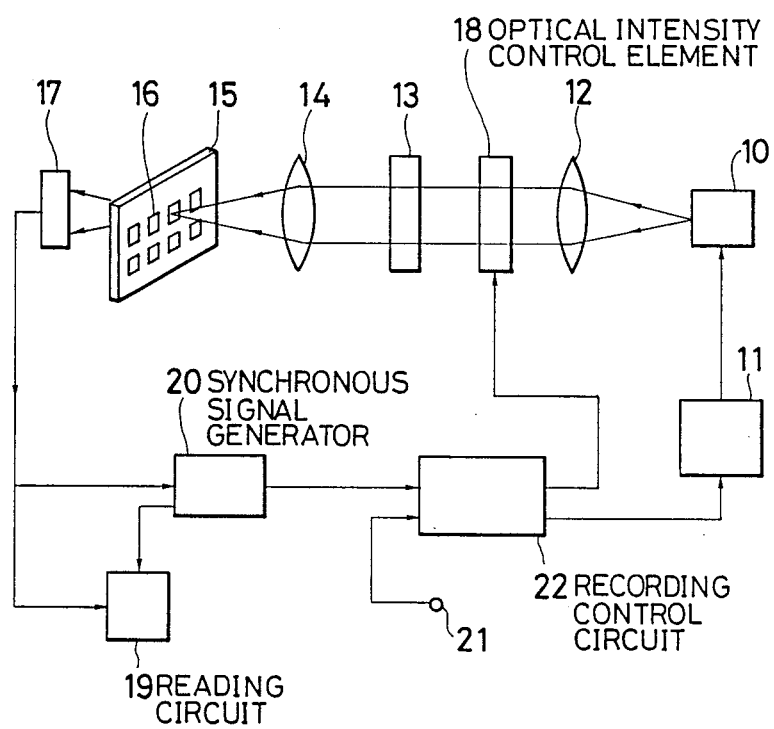
FIG. 3 is a structural diagram showing an embodiment of optical wavelength division multiplex recording and reproducing apparatus according to the invention.

An embodiment of the invention is explained below with reference to the accompanying drawings. Reference numerals 10 to 17 in FIG. 3 designate the same elements as in FIG. 1. As shown in FIG. 4B, however, every memory element 16, which is formed at a predetermined position on medium 15, has at least one prerecorded hole at the beginning of a range of scanning wavelength on an absorption spectrum for wavelength selective optical data storage, so that the wavelength at a beginning reference point for scanning can be identified. Reference numeral 18 is an optical intensity control element for which a known electrooptic modulator or acoustooptic modulator may be used, for instance. Reference numeral 19 designates a reading circuit which reads a reproduced signal output from detector 17 and 20 is a synchronous signal generator for generating a synchronous signal which is synchronized with a pulse output from photodetector 17 corresponding to the prerecorded hole. Reference numeral 21 is a terminal to which a writing control signal or writing information is input from an external computer and 22 is a recording control circuit which controls element 18 in accordance with the signals input from generator 20 and terminal 21.

Figure 4:
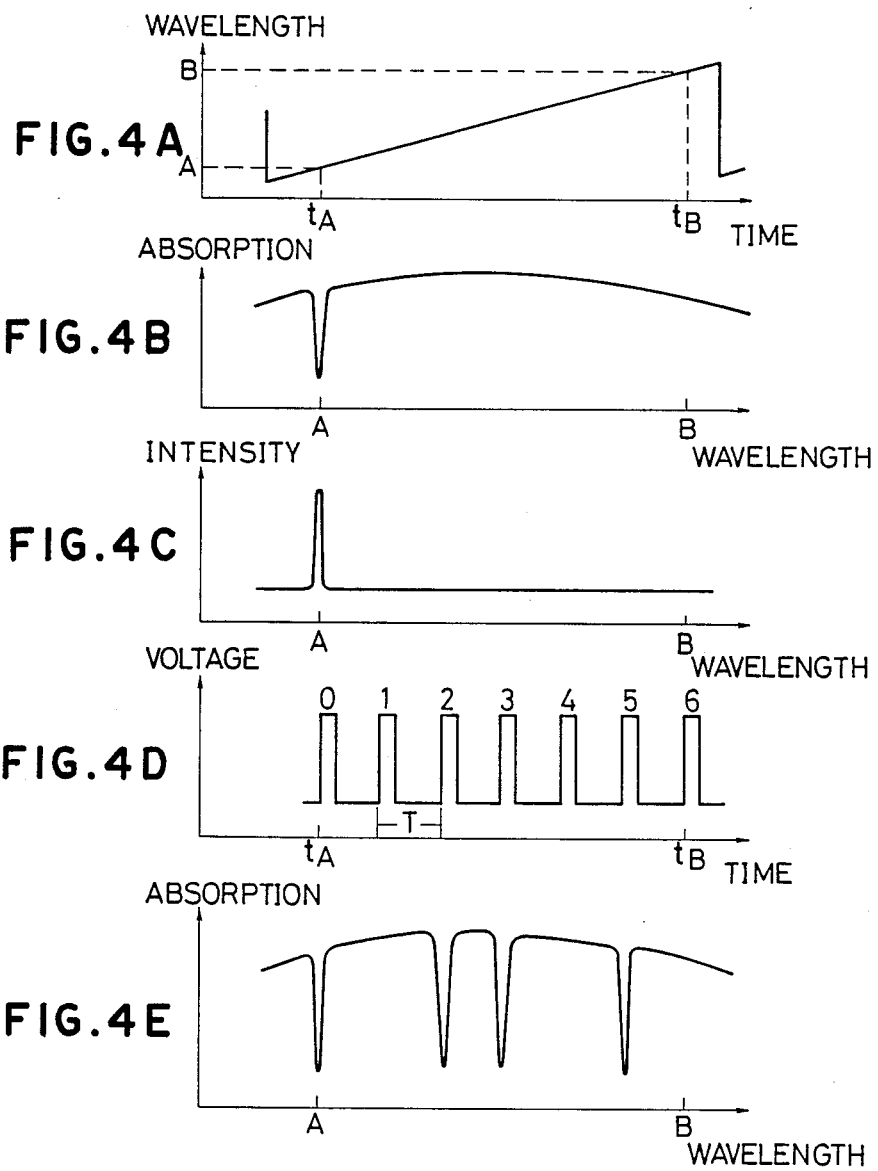
FIGS. 4A, 4B, 4C, 4D and 4E are explanatory diagrams explaining the principle of the embodiment shown in FIG. 3.
Figure 6:
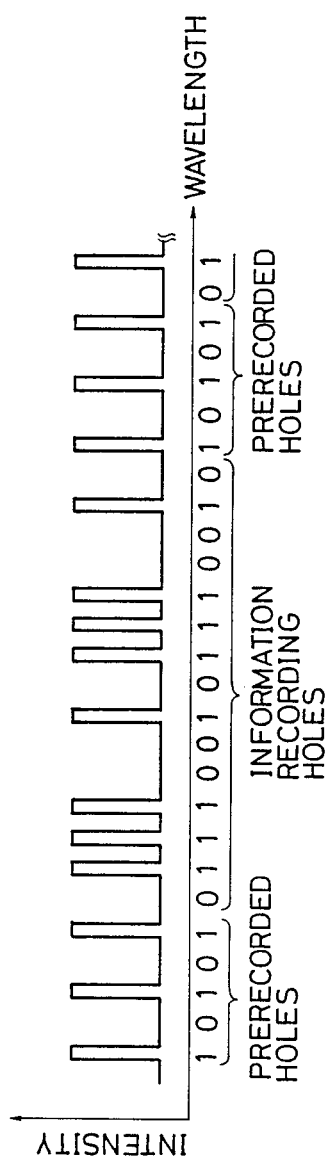
FIG. 6 is an explanatory diagram of a third embodiment of the invention.

In FIG. 3, the beam emitted from source 10 and collimated by lens 12 passes through element 18 and is deflected and focused by deflector 13 and lens 14, respectively, onto the selected element 16. The beam transmitted through or reflected by the selected element 16 is detected by photodetector 17. Controller 11 makes source 10 scan or tune the wavelength of the beam when a recording instruction is input from the external computer. As shown in FIG. 4A, the wavelength is scanned linearly from values A to B during the times $t_A$ to $t_B$. On every memory element 16, as shown in FIG. 4B, at least one prerecorded hole is created in advance at the beginning of scanning wavelength. Therefore the spectrum of the beam transmitted through element 16 appears as shown in FIG. 4C. Since the wavelength is scanned linearly with respect to the time as shown in FIG. 4A, photodetector 17 outputs time series signals which may be shown by replacing the abscissa of wavelength in FIG. 4C with the time. When the pulse corresponding to the prerecorded hole is input, generator 20 generates a synchronous signal with a time period of T as shown in FIG. 4D for instance. The value T is preferably selected to the time period corresponding to the minimum wavelength period of the recording holes which can be created within the range of wavelengths A to B on the spectrum shown in FIG. 4B, or otherwise, to the time period syncronized with it. In FIG. 4D, 6 pulses are shown during the times $t_A$ to $t_B$. The first pulse designated by numeral 0 corresponds to the prerecorded hole and the others designated by numerals 1 to 5 respectively are generated at a constant period from the first pulse. Since actually, thousands of holes can be created within the range of wavelengths A to B, thousands of synchronous pulses are generated by generator 20 and input into circuit 22. Element 18 is controlled by circuit 22 in accordance with the recording data which is input from terminal 21 and is synchronized with the synchronous pulses in circuit 22. Element 18 is opened when the recording bit is "1" and closed when "0". Therefore, the beam output from element 18 has a high or a low intensity corresponding to bits "1" or "0". The recording hole is created by the high level beam, but not by the low level beam FIG. 4E shows the spectrum of element 16 on which wavelength division multiplex recording has been performed. In this case, there exist 3 recording holes, in addition to one prerecorded hole, in accordance with the second, the third and the fifth synchronous pulses in FIG. 4D.

In order to reproduce the stored information the medium having the prerecorded hole and the recording holes as shown in FIG. 4E, the output signal from photodetector 17 and the synchronous pulses from generator 20 are input to the reading circuit 19. The reading circuit 19 reads the recorded data by comparing the level of the reproduced signal with a predetermined reference level at the timing of the synchronous pulses. This function is more clearly understood by comparing FIG. 4D with FIG. 4E.

Thus in the invention, because the information is recorded or reproduced in accordance with the synchronous signal synchronized with the prerecorded hole which is created in advance on every memory element, the requirement for precision in absolute wavelength is relaxed at the time of recording and reproducing. Thus the storage device is made highly and reliable.

Figure 5:
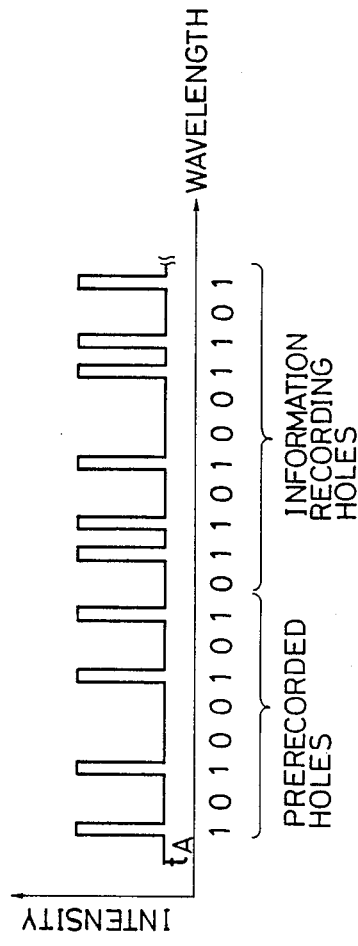
FIG. 5 is an explanatory diagram of a second embodiment of the invention.

Although, in the embodiment described above, only one prerecorded hole is created, a plurality of prerecorded holes can be formed at constant or varying periods. FIG. 5 shows an embodiment in which the prerecorded holes comprise 8 holes at the beginning of the range of variable wavelength. Any code, for example, an address code such as a memory element number, can be represented by the prerecorded holes. Also an address code can be positioned in front of or following the prerecorded holes.

When there exists at least one prerecorded hole in the middle of the scanning range of wavelength in addition to that at the beginning thereof, the oscillating period based on the beginning hole pulse can be adjusted by the middle hole pulse, and thereby more accurate synchronous signal can be provided.

In the case of FIG. 5, the prerecorded holes can be discriminated from the information recording holes by detecting a number of holes. In the case in which the prerecorded holes are positioned at a constant period, as shown in FIG. 6, they can be discriminated by detecting the period. Furthermore, when the prerecorded holes represent a code which never exists in the information data, the discrimination can be done by detecting the code. Also the absorption level of the prerecorded holes may be different from that of information recording holes by controlling the intensity of the recording beam. In this case the prerecorded and information holes can be discriminated from each other from the difference of levels of the reproduced signals thereof.

Although medium 15 is formed in a rectangular configuration and fixed at a predetermined position in the embodiment described above, it is envisioned that the medium 15 can take the form of a rotating disk. Moreover, the invention can be applied to the reflective type medium wherein a reflective film is inserted between a substrate of the medium and a recording layer having a characteristic of wavelength selective optical data storage.

What is claimed is:

1. A wavelength selective optical data storage system comprising:
   a light source emitting a light beam with a variable wavelength,
   a storage medium having at least one memory element with a characteristic of wavelength selective optical data storage, on which information is recorded by creating recording holes by a narrow band light beam at selected wavelength positions on an absorption spectrum of said memory element of said medium;

an optical means for guiding and focusing the beam emitted from the source onto the recording medium, and a photodetector for detecting the beam emitted from said source after it is transmitted through or reflected by the recording medium, and wherein the absorption spectrum of every memory element has at least one prerecorded hole at a predetermined wavelength position for acting as a reference for identifying wavelength positions of the recording holes to be recorded on or read from each of said memory elements.

2. A wavelength selective optical data storage system according to claim 1, and further comprising a synchronous signal generator for generating a synchronous signal; and wherein said photodetector generates a pulse output signal corresponding to the presence of said prerecorded hole so that the wavelength positions are identified in accordance with said synchronous signal which is generated at a constant period in synchronism with said pulse output signal from the photodetector.

3. A wavelength selective optical data storage system according to claim 1, wherein the prerecorded hole has an absorption level in said recording medium different from that of the recording hole to allow discrimination between said prerecorded hole and said recording hole.

4. A wavelength selective optical data storage system according to claim 1, wherein the prerecorded hole is created at the beginning of a wavelength range of the absorption spectrum of said memory element occupied by recording holes.

5. A wavelength selective optical data storage system according to claim 1, wherein an address code of the memory element is recorded at a wavelength position preceding or following the predetermined wavelength position of the prereorded hole.

6. A wavelength selective optical data storage system according to claim 1, wherein the prerecorded hole represents an address code of the element.

7. A wavelength selective optical data storage system according to claim 2, wherein the absorption spectrum of said memory element has at least one additional prerecorded hole in the middle of a wavelength range of the absorption spectrum occupied by said recording holes for enabling adjustment of the period of the synchronous signal.

8. A wavelength selective optical data storage system according to claim 1, wherein the recording medium has a reflective film for reflecting the beam.

* * * * *